W. G. WILSON.
MACHINE FOR MOVING AND DEPOSITING CONCRETE AND OTHER MATERIAL.
APPLICATION FILED AUG. 1, 1912.
1,069,308.
Patented Aug. 5, 1913.
4 SHEETS—SHEET 1.
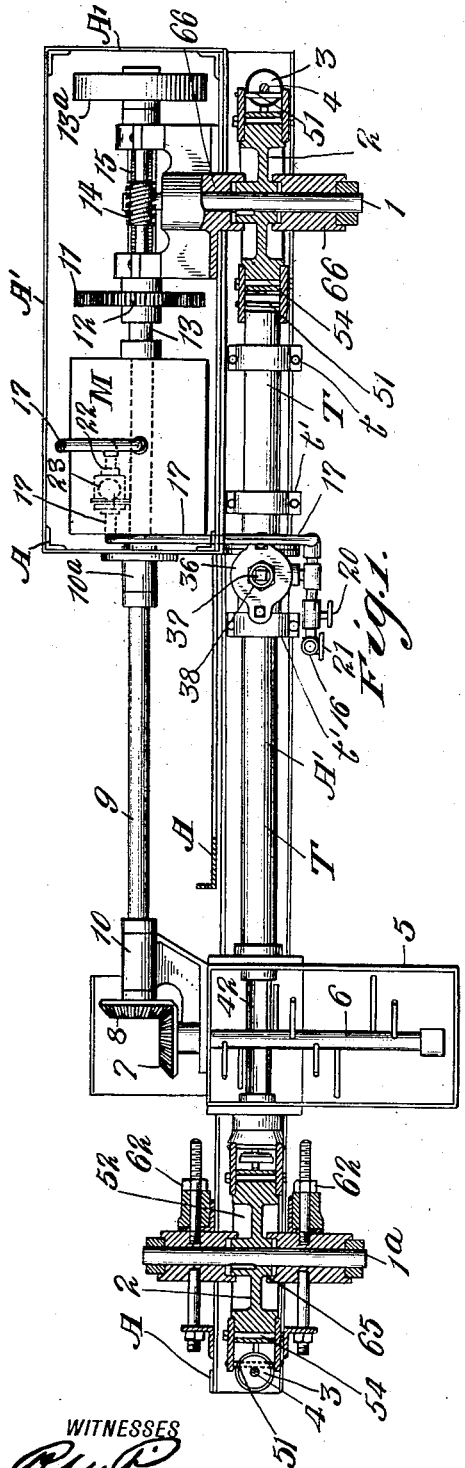
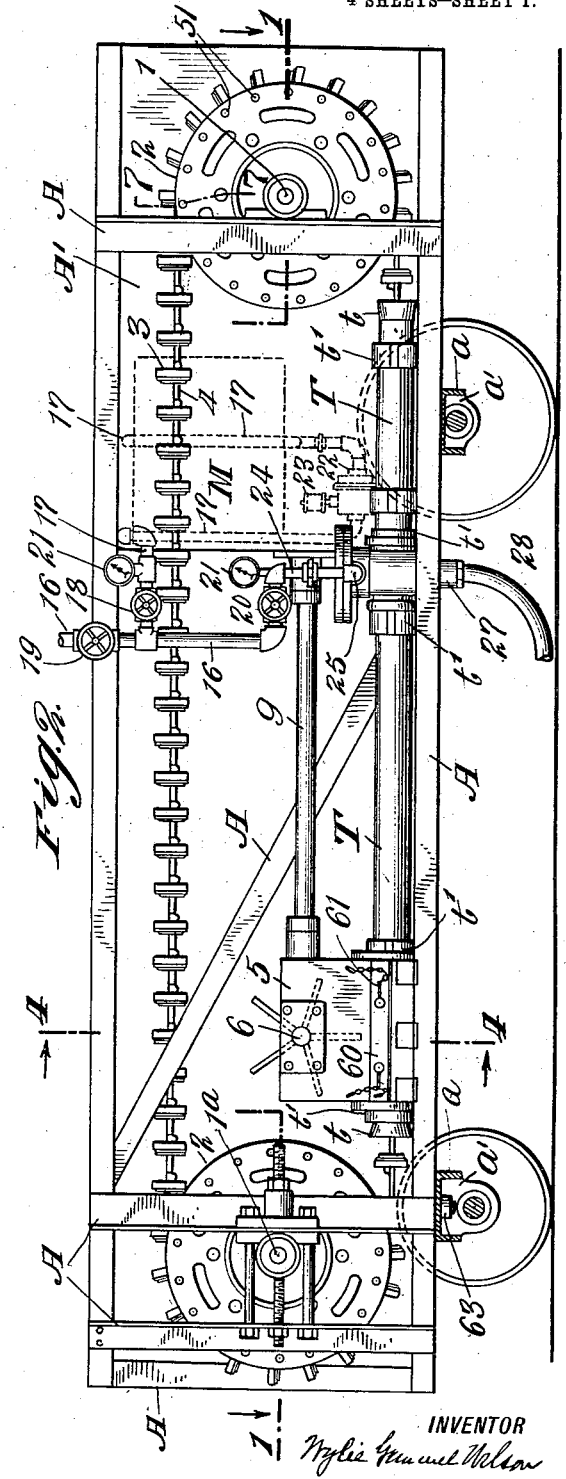
WITNESSES
INVENTOR
BY
ATTORNEY W. G. WILSON.
MACHINE FOR MOVING AND DEPOSITING CONCRETE AND OTHER MATERIAL.
APPLICATION FILED AUG. 1, 1912.

1,069,308.

Patented Aug. 5, 1913.

4 SHEETS—SHEET 2.

WITNESSES

INVENTOR

BY

ATTORNEYS

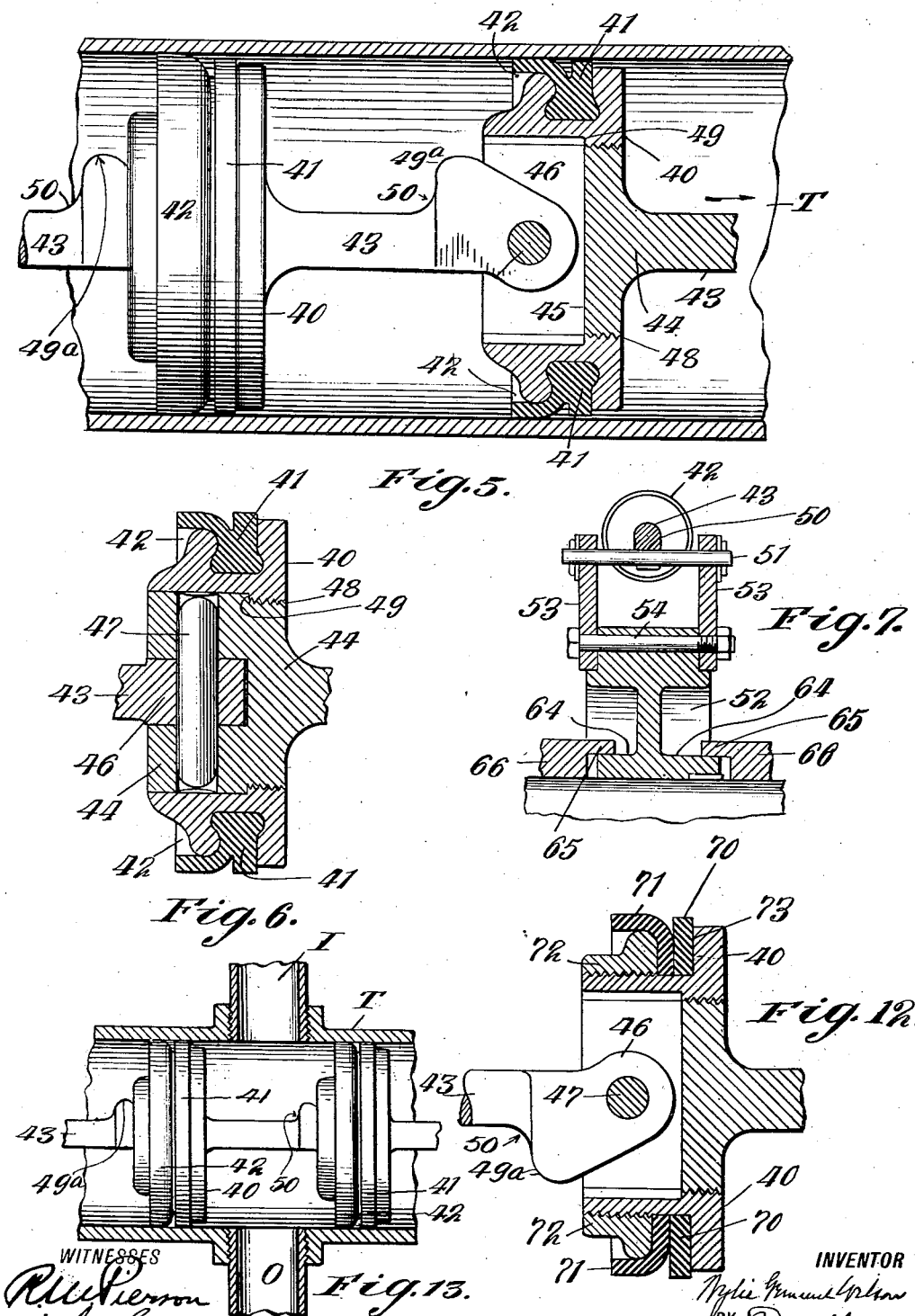

W. G. WILSON.
MACHINE FOR MOVING AND DEPOSITING CONCRETE AND OTHER MATERIAL.
APPLICATION FILED AUG. 1, 1912.
1,069,308.
Patented Aug. 5, 1913.
4 SHEETS—SHEET 4.
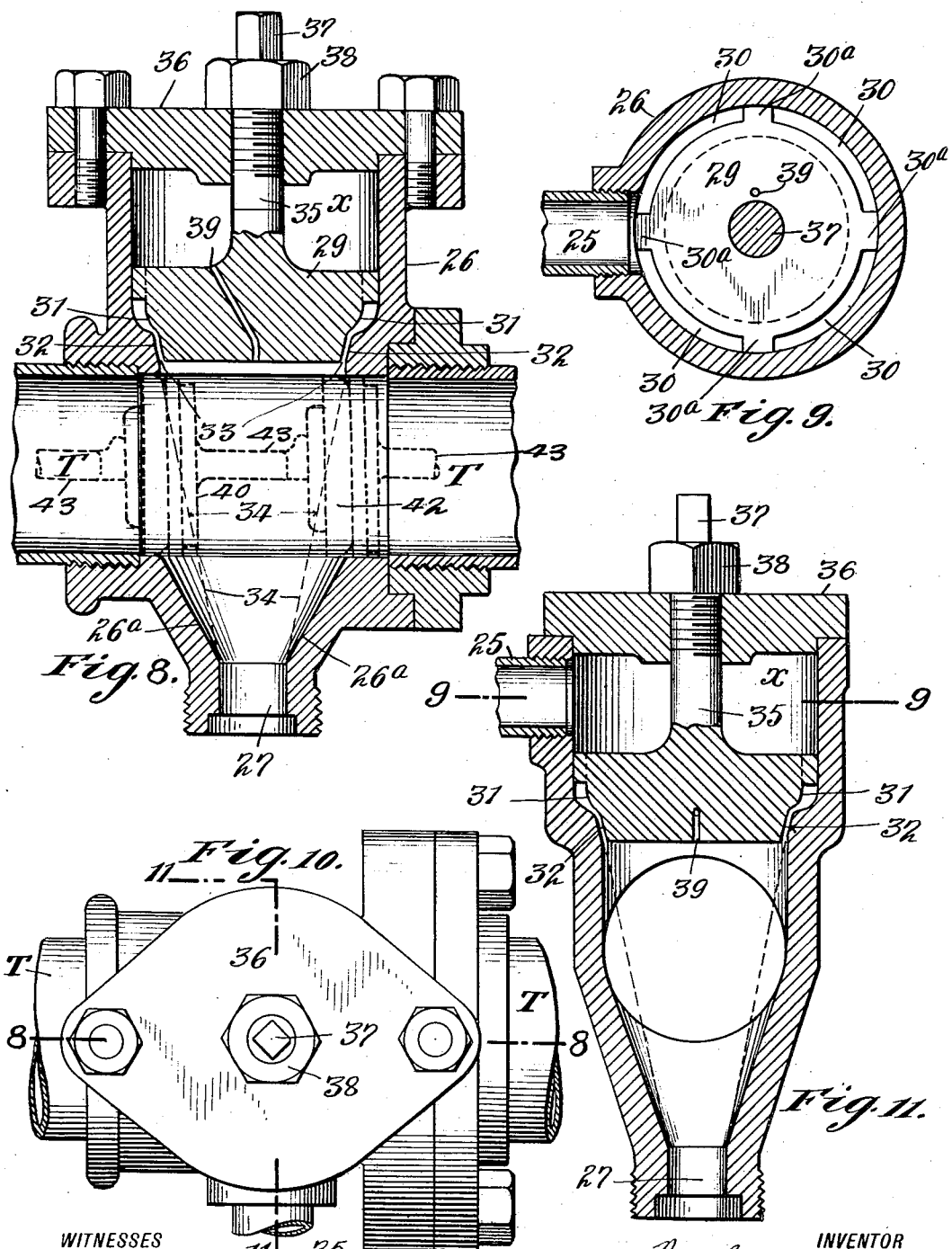

UNITED STATES PATENT OFFICE.

WYLIE GEMMEL WILSON, OF ELIZABETH, NEW JERSEY, ASSIGNOR TO W. G. WILSON COMPANY, OF MONTCLAIR, NEW JERSEY, A CORPORATION OF NEW JERSEY.

MACHINE FOR MOVING AND DEPOSITING CONCRETE AND OTHER MATERIAL.

1,069,308.    Specification of Letters Patent.    Patented Aug. 5, 1913.

Application filed August 1, 1912. Serial No. 712,816.

*To all whom it may concern:*

Be it known that I, WYLIE GEMMEL WILSON, a subject of the King of Great Britain, residing at Elizabeth, in the county of Union and State of New Jersey, have invented certain new and useful Improvements in Machines for Moving and Depositing Concrete and other Material, of which the following is a specification, reference being had therein to the accompanying drawing.

This invention relates to a machine for conveying and forcibly discharging plastics, wet sand, liquids, etc.

The main objects of the invention are to produce a compact machine in which clogging is minimized, which will discharge continuously under most service conditions.

Figure 3:
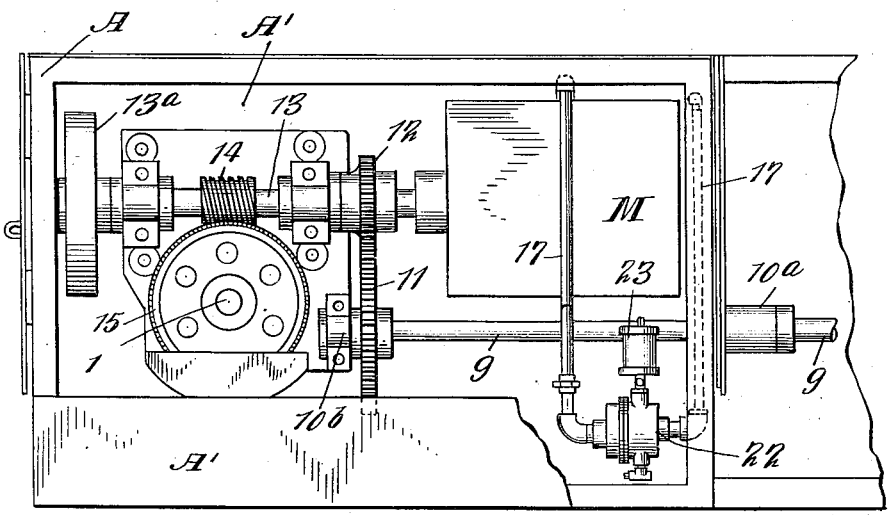
Figure 4:
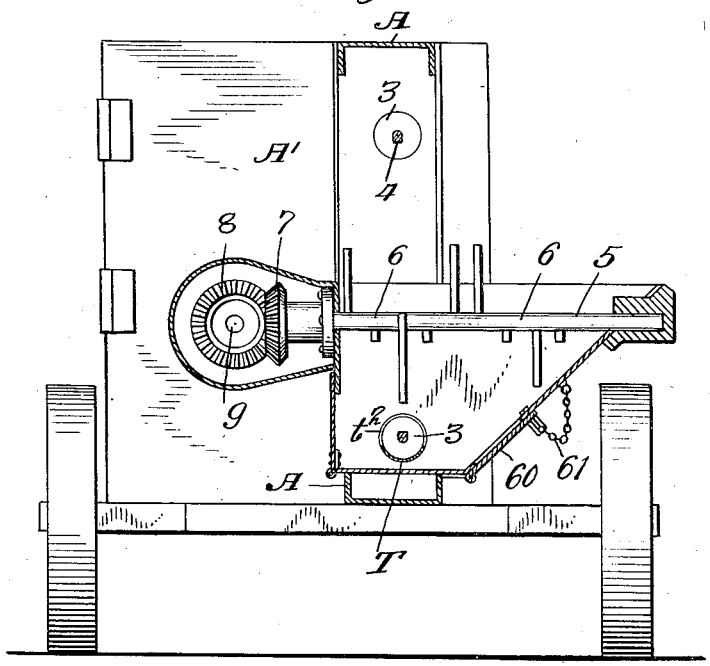

In the accompanying drawings, illustrating this invention, Figure 1 is in part a top plan view, and in part a horizontal section, at line 1—1 of Fig. 2, of my new conveying and discharging machine; Fig. 2 is a front elevation of the same, shown on wheels; Fig. 3 is a vertical elevation looking from the rear side of the machine, at that end of it which carries an air motor for driving the conveyer and agitator; Fig. 4 is a view partially in end-elevation and partially in transverse vertical section, at line 4—4 of Fig. 2; Fig. 5 is a view, in lengthwise central section, of a portion of the conveyer casing; and in diametric vertical section of a conveyer disk and of a portion of a sprocket chain carrying the disks; and, partially in side elevation, of another disk and other links of the sprocket-chain; Fig. 6 is a diametric sectional view of one of the conveyer disks removed, and of portions of two sprocket-chain members. This view is at right angles to the disk section in Fig. 5; Fig. 7 is a radial sectional view of one of the sprocket-wheels, at line 7—7 of Fig. 2. This view also shows a conveyer disk and a conveyer chain member in working position with reference to the sprocket-wheel; Fig. 8 is a vertical central section, at line 8—8 of Fig. 10, of the discharge valve of the machine and conveyer casing between portions of which the discharge valve is located; Fig. 9 is a transverse sectional view, at line 9—9 of Fig. 11, showing the valve-body of the discharge valve in plan view; Fig. 10 is a top plan view of the discharge valve, portions of the conveyer casing and a portion of the air-inlet into the discharge valve; Fig. 11 is a vertical central section of the discharge valve at a line corresponding to 11—11 of Figs. 8 and 9; Fig. 12 is a diametric sectional detail of a modified form of one of the conveyer disks, and shows a portion of the chain-link transversely pinned in a slot thereof; Fig. 13, is a lengthwise sectional detail of a modified form of the apparatus in which the voluter discharging device is omitted, the fluid inlet and the discharge ports of the conveyer casing being opposite one another and formed by holes in the wall of the casing.

Referring to the drawings, A indicates the machine-frame. The under side of the frame is provided with a pair of transverse U-beams $a$ spaced apart and mounted with their concave sides down to receive each a wheel-axle $a'$, or a transverse bar. The axles $a'$—$a'$ are shown with wheels on which the frame is conveniently mounted; but the wheels may be removed so that four men can readily carry it about by taking hold of the axle-ends or of transverse bars substituted therefor.

1 is a sprocket-wheel shaft for driving the conveyer, and $1^a$ is another sprocket-wheel shaft. These shafts are located in suitable bearings, near the opposite ends of frame A, and each has fixed upon it a sprocket-wheel 2, which supports an endless conveyer made up of a series of disks 3 and a sprocket-chain 4, on which the disks 3 are centrally mounted and fixed at distances apart to form material receiving spaces or pockets around the chain and between adjacent disks. A hopper 5, for material, is mounted on frame A and provided with a rotatable agitator having a central shaft 6, one end of which is provided with a beveled gear 7 that meshes with a beveled gear 8 on a shaft 9, extending lengthwise of the machine. Shaft 9 is mounted in bearings 10 and $10^a$ (Fig. 1) and $10^b$ (Fig. 3). It carries a gear 11, which meshes with a gear 12 on the shaft 13 of an air-motor M, which is carried by frame A. This shaft 13 is provided with a worm-gear 14, which meshes with a gear 15 (Fig. 1) on sprocket-wheel shaft 1. When motor M is operated, its shaft 13 drives sprocket-wheel shaft 1 and so actuates the conveyer, and at the same time the gears 12 and 11 cooperate to drive the shaft 9 which rotates the agitator shaft and keeps material in the reservoir or hopper 5 constantly agitated to cause it to fall into the pocket spaces of the conveyer which passes bodily through the bottom portion of the reservoir. Air-motor shaft 13 is provided with a fly-wheel 13ª.

A conduit 16 is provided for connection with a source of compressed air, not shown, and has a branch pipe 17 for supplying compressed air to motor M. A regulable shut-off valve 18 is provided in branch 17, and a similar valve 19 is provided for conduit 16 at its connection with the machine. Conduit 16 is also provided with a regulable shut-off valve 20, adjacent to the air-discharge valve of the machine, and pressure indicators 21 are provided for branch 17 and conduit 16, as shown. Branch 17, for the air-motor, after passing its pressure indicator, passes horizontally from the front to the rear side of the machine, and then downwardly, as shown in Fig. 3, to an air-strainer 22 provided with an oil-cup 23. From strainer 22 it extends upwardly and thence to the top of the motor, where it makes connection therewith, as shown in Fig. 1. Conduit 16, after its connection with its pressure gage 21, makes connection with a vertical pipe 24 (Fig. 2), which extends downwardly into an elbow 25 (Figs. 2, 9, 10 and 11), which discharges into a chamber $x$ in the discharge valve casing 26 of the machine, above the valve-body vertically mounted therein.

The endless conveyer travels through and from the hopper to and about the sprocket-wheel on shaft 1, and in this course runs through a tube T, the opposite ends of which are flared at $t$, and which is held to frame A by straps $t'$ $t'$. Tube T passes through the lower part of the hopper and therein has an upper portion $t^2$ cut away for admission of material into the conveyer pockets (Fig. 4). The exit port 27 of this discharge valve is adapted to be provided (Fig. 2) with a hose pipe 28 through which the material is discharged, ordinarily, although it may be discharged directly from the port 27. The valve-body 29 has its upper periphery cut away quarteringly at 30 (Fig. 9) for outflow of air from chamber $x$ in a conoidal blast transversely through a conveyer pocket and the discharge exit 27. The valve-body is reduced in diameter below the four wings 30ª of the upper portion of the valve, these wings being integral extensions of the upper portion of the valve-body 29 and lying between the air-passages 30. The reduced portion of the valve-body is preferably of two diameters, forming a curved shoulder at 31 about midway between the upper and larger diameter of the reduced portion of the valve-body and its under and smaller diameter. The inner wall of chamber $x$, where it surrounds the reduced portion of valve-body 29, is formed with a wall parallel with the under-end taper of the valve-body, as at 32, forming an annular tapering air-passage 33 through which an air blast of conoidal form is convergingly directed to the discharge exit 27, which is opposite the under-end of the valve-body 29, the axis of the stem 35 of the valve-body being in line with the center of the exit port 27, and the valve casing being conoidally shaped at 26ª, on its under-side and above the exit port 27, and tapering inwardly and downwardly. The stem 35 of valve-body 29 is threaded and screwed through a hole in the top-plate 36 of the valve casing. The upper end of the valve-stem is made polygonal at 37 for application of a wrench, and the valve-body is held in place by a nut 38. By adjustment of the nut and threaded valve-stem the valve-body may be adjusted up or down and properly held in adjusted position for increasing or diminishing the outflow of the conoidal air-blast between the walls 31 and 32.

The purpose of the conoidal air-blast which is the preferred form of the blast, is, first, that the blast may act progressively on the contents of a conveyer pocket; secondly, that when the conveyer pocket is moved directly into the path of the conoidal air-blast the latter may simultaneously act on the opposite end-portions of the contents of the pocket; and thirdly, that when, in the progress of the conveyer, one disk is in a position to expose the contents of two pockets to the action of the blast, one side of the conoid may operate in one pocket, and the other in another. As a draft of this character tends to create a vacuum within its chamber, a small opening 39 is made through the valve-body 29 to destroy this vacuum.

While various forms of sprocket-chains and sprocket wheels may be used in the conveying mechanism, yet as compactness is highly important in a machine of this type, in order to reduce its dimensions to such an extent that the machine can be used in comparatively restricted spaces; and as it is important to prevent the air, forced through a pocket for the discharge thereof, from flowing out of the pocket past the adjacent disks which form the pocket-ends, particular attention has been devoted to the conveyer structure. In the preferred form illustrated, each disk, generally indicated by 3 in Figs. 1 and 2, comprises a metal disk 40, which is peripherally grooved to hold a petticoat rubber ring 41, the diameter of the disk 40 being less than the interior diameter of the tube or casing T, and the diameter of the rubber ring being such as to make an air-tight fit in the tube. Preferably, these rubber rings are vulcanized in place, and each provided with an integral, annular, lateral extension or petticoat 42, the inner wall of which is exposed on the back side of each disk. An arrow at the right of Fig. 5 indicates the direction of movement of the conveyer, and it will be seen that any air-pressure on the back side of the right-hand disk, shown in section, will expand the petticoat 42 and make a more perfectly air-tight joint than would otherwise be formed. Each disk is connected with an adjacent disk by a sprocket-chain link 43, having an enlarged threaded end 44 detachably screwed in a threaded central opening of the front wall of the disk; the latter, rearwardly of the link-head 44, having a transverse slot 45 in which the front end 46 of a chain-link is pivoted by a pin 47 that is at right-angles to the slot 45. The rearward portion of each disk 40 covers the ends of the pin (compare Figs. 5 and 6), so that concrete or other material conveyed in the pockets cannot gain access to the pivot joint and interfere with the proper flexing of the sprocket-chain around the sprocket-wheels. The detachable connection between the disks 40 and the link-heads 44 is made by a threaded connection at 48; the link-head being provided with an annular shoulder 49 against which disk 40 abuts when it is screwed in place. These disks should be made as thin as feasible, in order that their peripheral edges may not fully stop the transverse passage of the air-blast through the conveyer tube T, but, on the contrary, interfere with the continuous passage of that blast to as slight an extent as possible. By making the disks of the conveyer thinner than the diametric dimensions of the air-valve casing 26, between the valve-body 29 and the top of the conoidal portion 26ª at the foot of the valve casing, a continuous and non-intermittent discharge from the machine is effected.

The construction of the conveyer disks and chain-links described is advantageous, because, in case of a break in the chain or of the wearing away of the rubber packings, repairs and substitutions can be quickly made, and this is very important in regard to the labor-expense of operating the machine. That edge of each chain-link, which engages a rung of the sprocket-wheel, is curved at 49ª to form a shoulder thereat to engage the rung (Fig. 7), and is transversely flattened at 50 to prevent the sprocket-chain from rocking laterally on the sprocket-wheel rungs 51. For compactness, a special form of sprocket-wheel is shown, consisting of a hub portion 52, on which a pair of side rings 53 are oppositely mounted and bolted in place by transverse bolts 54. The sprocket-wheel rungs 51 are pins fixed through the outer margins of these plates 53, which are spaced far enough apart to permit the conveyer chain disks to be received between the plates, as shown in Fig. 7. The hopper of reservoir 5 is conveniently provided with a door 60 and a chain-and-bolt construction 61 for keeping the door shut.

The sprocket-wheel on shaft 1ª is provided with chain-tensioning mechanisms 62, which may be of any desired construction. One of the cross-pieces $a$, on which the frame is supported, is conveniently formed with a king-bolt 63, so that the axle $a'$, mounted in that cross-piece, may be readily turned. The hub 52 of each sprocket-wheel is preferably formed with lateral flanges 64, which are overlapped by annular flanges 65 of the opposite bearings 66. Portions of the machine are cased in by casing members A'.

In Fig. 12 I have shown a slight modification in which the rubber washers are shown in two parts, 70, 71; the latter being the petticoat member, and both of them being held in place by a hollow nut 72 threaded on the periphery of disk member 40, and serving to clamp both of the rubber rings 70 and 71 tightly against the shoulder 73. The construction described is such that the compressed air (any other fluid under pressure may be used) enters and moves through the conveyer pockets successively, and thence passes through the discharge-port carrying the contents of the pockets as they are successively brought between the pressure-fluid inlet and the discharge ports. At the same time the rubber rings 41 form air-locks with the wall of the tube T, at each side of said ports, which prevent escape from the conveyer pockets of the fluid under pressure that passes through them. The highly important point of this construction is that the fluid under pressure clears the pockets that contain material without permitting the material to escape, except through the discharge-port; and the ports are so arranged with reference to the pockets that the fluid-current cannot act to pack the pockets or to retard their almost instantaneous discharge. In some classes of work, the valve-body 29 may be dispensed with. In such case, the inlet port should be properly reduced in dimensions; but for most uses, especially with plastic or powdered materials, the valve 29 is desirably used and shaped to secure the conoidal air-blast that removes the material in the pocket gradually from the sides of the mass.

In Fig. 13, the conoidal air-blast device is omitted and the fluid inlet port I and the discharge port O are formed by oppositely located openings in the wall of the conveyer casing.

I do not herein claim various novel features described, because they are claimed in my application Serial No. 636,501, filed July 1, 1911, and allowed Aug. 21, 1912.

What I claim, is:

1. The combination of an open-ended conveyer casing and a valve-casing with an endless, flexible conveyer; and mechanism for actuating the conveyer, the conveyer having a series of pockets and being movable through both casings, and the valve-casing having an inlet port and a discharge port, and a valve-body mounted in the valve casing for control of the current passing from the inlet port, past the valve-body and through a pocket of the conveyer and out of the discharge port.

2. The combination of an open-ended conveyer casing and a valve-casing with an endless, flexible conveyer; and mechanism for actuating the conveyer, the conveyer having a series of pockets and being movable through both casings, and the valve-casing having an inlet port and a discharge port, and a valve-body mounted in the valve casing for control of the current passing from the inlet port, past the valve-body and through a pocket of the conveyer and out of the discharge port, the valve-body having an air-escape passage through it.

3. The combination of a pocketed conveyer and a casing therefor having a discharge port and an inlet port for a fluid under pressure, said ports being adapted to register one with another through the pockets of the conveyer as they are successively brought between said ports; and for the inlet port a controlling device formed to direct the entering fluid under pressure initially against the side portion or side portions of the successive charges in the pockets.

In testimony whereof I have affixed my signature in presence of two witnesses.

WYLIE GEMMEL WILSON.

Witnesses:
EDWARD S. BEACH,
EDWARD E. BLACK.